United States Patent

Tsai et al.

[11] Patent Number: 5,889,879
[45] Date of Patent: Mar. 30, 1999

[54] OBJECT RECOGNIZER

[76] Inventors: Yeong-Shyeong Tsai, No. 2-1, Lane 395, Kuokuang Rd., Taichung; Wang-Jr Li, No. 141, Fu Hsing Rd., Lu Chou Hsiang, Taipei Hsien, both of Taiwan

[21] Appl. No.: 805,938

[22] Filed: Feb. 25, 1997

Related U.S. Application Data

[63] Continuation-in-part of Ser. No. 439,103, May 11, 1995.

[51] Int. Cl.$^6$ ........................................ G06K 9/00
[52] U.S. Cl. .................. 382/123; 178/18.09; 382/154; 382/181; 382/256; 382/312; 382/314; 382/315; 382/317
[58] Field of Search ................... 382/181, 256, 382/317, 321, 314, 315, 312, 154, 123; 178/18.09

[56] References Cited

U.S. PATENT DOCUMENTS

| | | | |
|---|---|---|---|
| 3,313,941 | 4/1967 | Marks | 250/566 |
| 3,992,571 | 11/1976 | Garlick et al. | 178/34 |
| 4,561,731 | 12/1985 | Kley | 350/510 |
| 4,573,191 | 2/1986 | Kidode et al. | 382/106 |
| 5,177,346 | 1/1993 | Chisholm | 235/462 |

*Primary Examiner*—Leo H. Boudreau
*Assistant Examiner*—Kanji Patel
*Attorney, Agent, or Firm*—Sixbey, Friedman, Leedom & Ferguson, PC; Stuart J. Friedman

[57] ABSTRACT

An object recognizer includes a computer system, a spatial division sensing device including a first sensor, a second sensor, and a first polarizer. An object feature generator is attached to an object and includes a plurality of object feature correspondents, and a plurality of second polarizers. By such an arrangement, the first sensor is able to detect a first signal from the second polarizers and the object feature correspondents to form a first polarized image. The second sensor co-operating with the first polarizer is able to detect a second signal from the second polarizers and the object feature correspondents to form a second polarized image. The computer system is able to execute an operation between the first image and the second image to obtain a third image, thereby determining the positions of the second polarizers on the third image so as to locate the object. The computer system is then able to detect patterns of the object feature correspondents on the first image, thereby recognizing the type of the object.

5 Claims, 5 Drawing Sheets

OBJECT RECOGNIZER

OBJECT RECOGNIZER

The present invention refers to a Continuation-In-Part Application of the Applicant's U.S. patent application Ser. No. 08/439,103, filed on May 11, 1995.

FIELD OF THE INVENTION

The present invention relates to an object recognizer.

BACKGROUND OF THE INVENTION

The closest prior art of a polarization detector was disclosed in Garlick et al. U.S. Pat. No. 3,992,571, filed on May 9, 1974.

SUMMARY OF THE INVENTION

The primary objective of the present invention is to provide an object recognizer which can be used to identify an object automatically.

In accordance with one aspect of the present invention, there is provided an object recognizer comprising a computer system, a spatial division sensing device including a first sensor, a second sensor, and a first polarizer co-operating with the second sensor.

An object feature generator is attached to the object and includes a plurality of ring-shaped object feature correspondents, and a plurality of second polarizers.

By such an arrangement, the first sensor is able to detect a first signal supplied from the second polarizers and the object feature correspondents to form a first polarized image.

The second sensor co-operating with the first polarizer is able to detect a second signal supplied from the second polarizers and the object feature correspondents to form a second polarized image.

The computer system is able to execute an operation between the first image and the second image to obtain a third image, thereby determining the positions of the second polarizers on the third image so as to locate the object. The computer system is then able to detect patterns of the object feature correspondents on the first image, thereby recognizing the type of the object.

Further features of the present invention will become apparent from a careful reading of the detailed description with appropriate reference to the accompanying drawings.

DETAILED DESCRIPTION OF THE PREFERRED EMBODIMENTS

Figure 1:
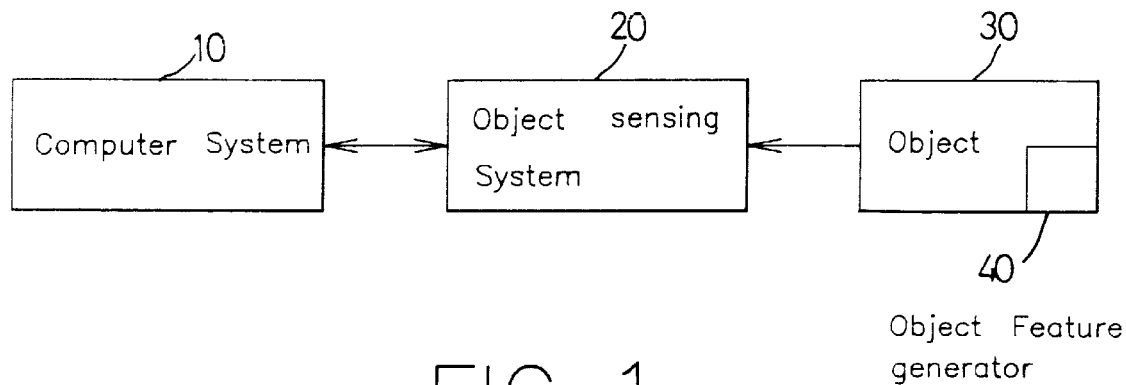
FIG. 1 is a flow chart of an object recognizer in accordance with the present invention.

Referring to the drawings, and initially to FIG. 1, an object recognizer in accordance with the present invention is provided for recognizing an object such as a book, a cup and the like by means of using an automatic image processing procedure.

The object recognizer comprises a computer system 10, an object sensing system 20 and an object feature generator 40.

Figure 2:
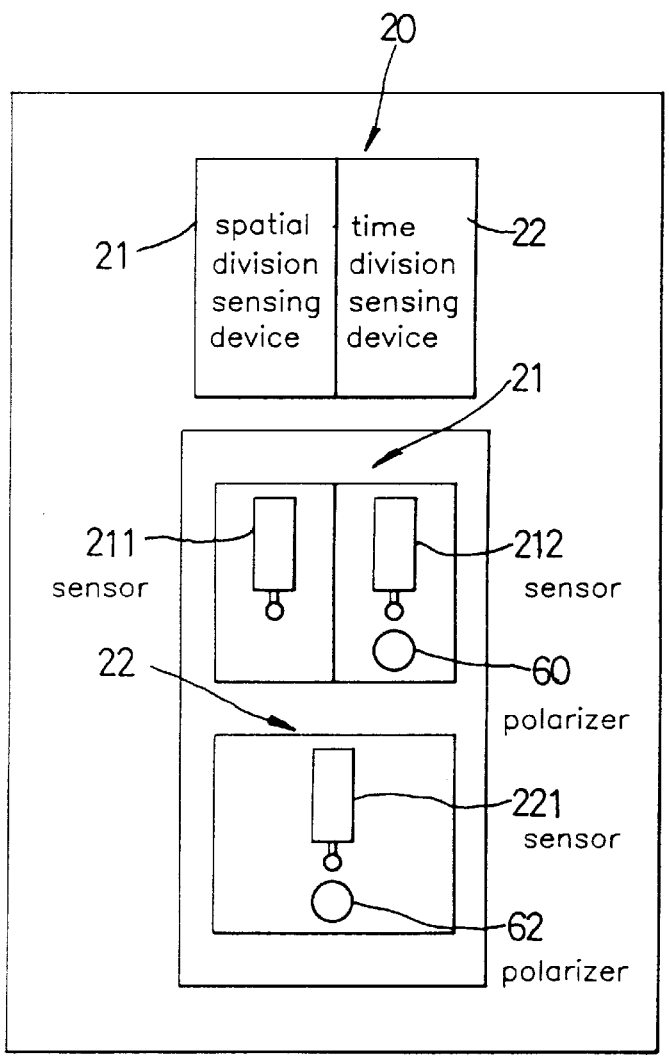
FIG. 2 shows components of an object sensing system of the object recognizer.

Referring now to FIG. 2, the object sensing system 20 comprises a spatial division sensing device 21 and a time division sensing device 22.

The spatial division sensing device 21 comprises a sensor 211, and a sensor 212 co-operating with a polarizer 60.

The time division sensing device 22 comprises a sensor 221 which can be adapted to co-operate with a polarizer 62.

Figure 3:
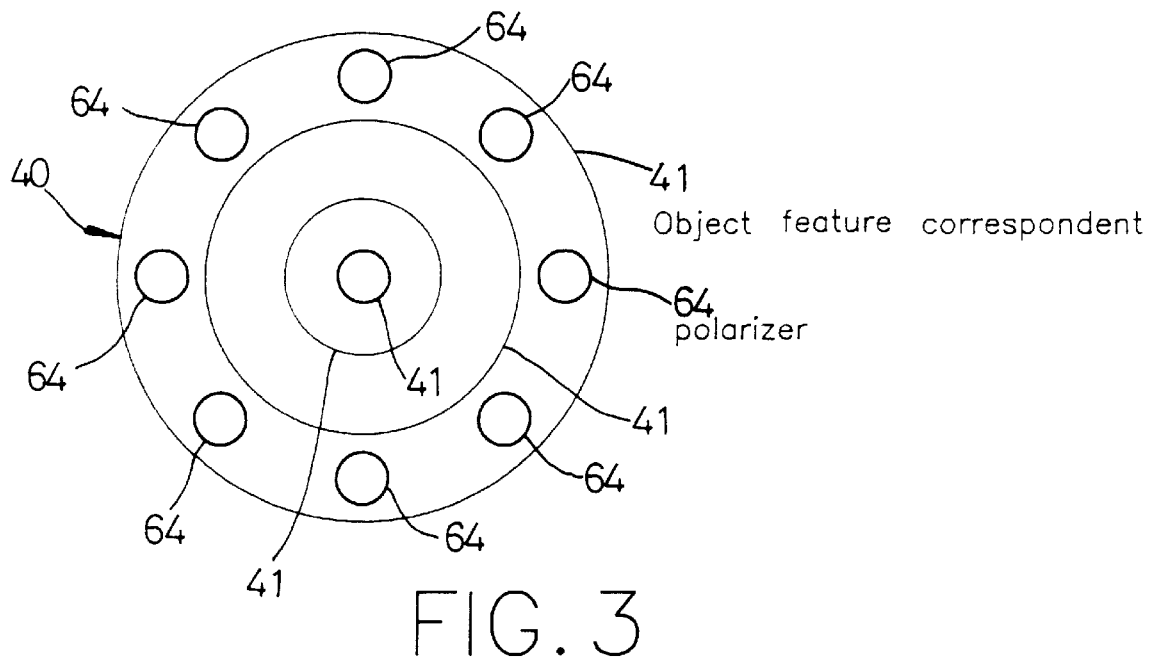
FIG. 3 shows components of an object feature generator of the object recognizer.
Figure 5:
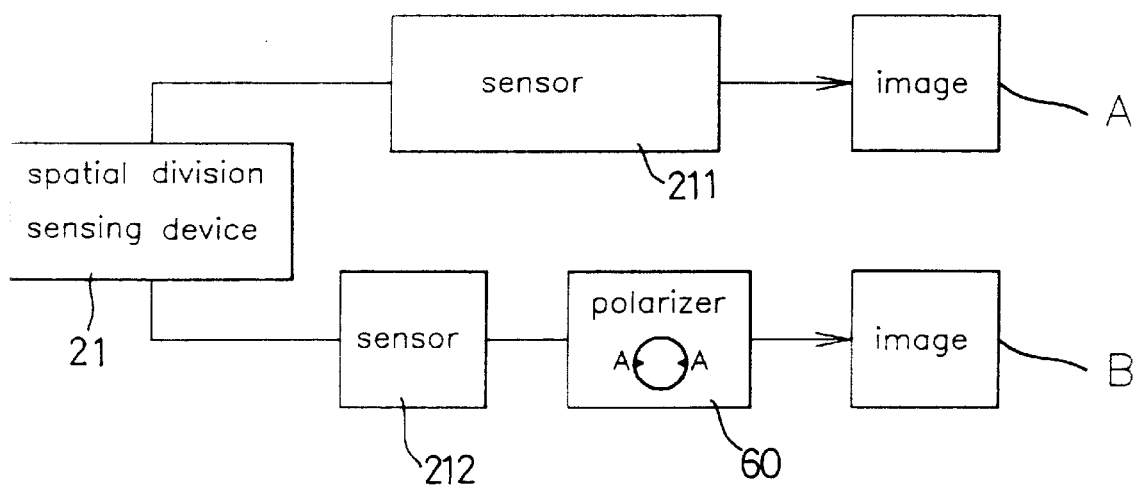
FIG. 5 is a flow chart showing an operation of a spatial division sensing device.

Referring now to FIG. 3 with reference to FIG. 1, the object feature generator 40 is similar to a sticker and may be made of a piece of paper, a film and the like which can be attached or stuck to an outer surface of the object 30 by means of such as an adhesive or a binding agent.

The object feature generator 40 comprises a plurality of, e.g., four ring-shaped object feature correspondents 41 formed thereon which are concentrically arranged. Each of the four object feature correspondents 41 is preferably a ring-shaped encoder and represents a circle of color (or pattern).

The four object feature correspondents 41 can be combined to form a group of color combination. For example, the four object feature correspondents 41 can be combined to form a color group of red-yellow-green-blue, red-yellow-red-black, red-red-green-green or the like such that the 4different groups of the four object feature correspondents 41 represent different types of object generators 40. By such an arrangement, the group of the object feature correspondents 41 can be used for indicating the type of the object feature generator 40 and further indicating the type of the object 30.

A plurality of, e.g., eight polarizers 64 are each stuck or attached on the object feature generator 40 by means of such as an adhesive or a binding agent. Preferably, each of the eight polarizers 64 is diametrically opposite in pairs.

Figure 4:
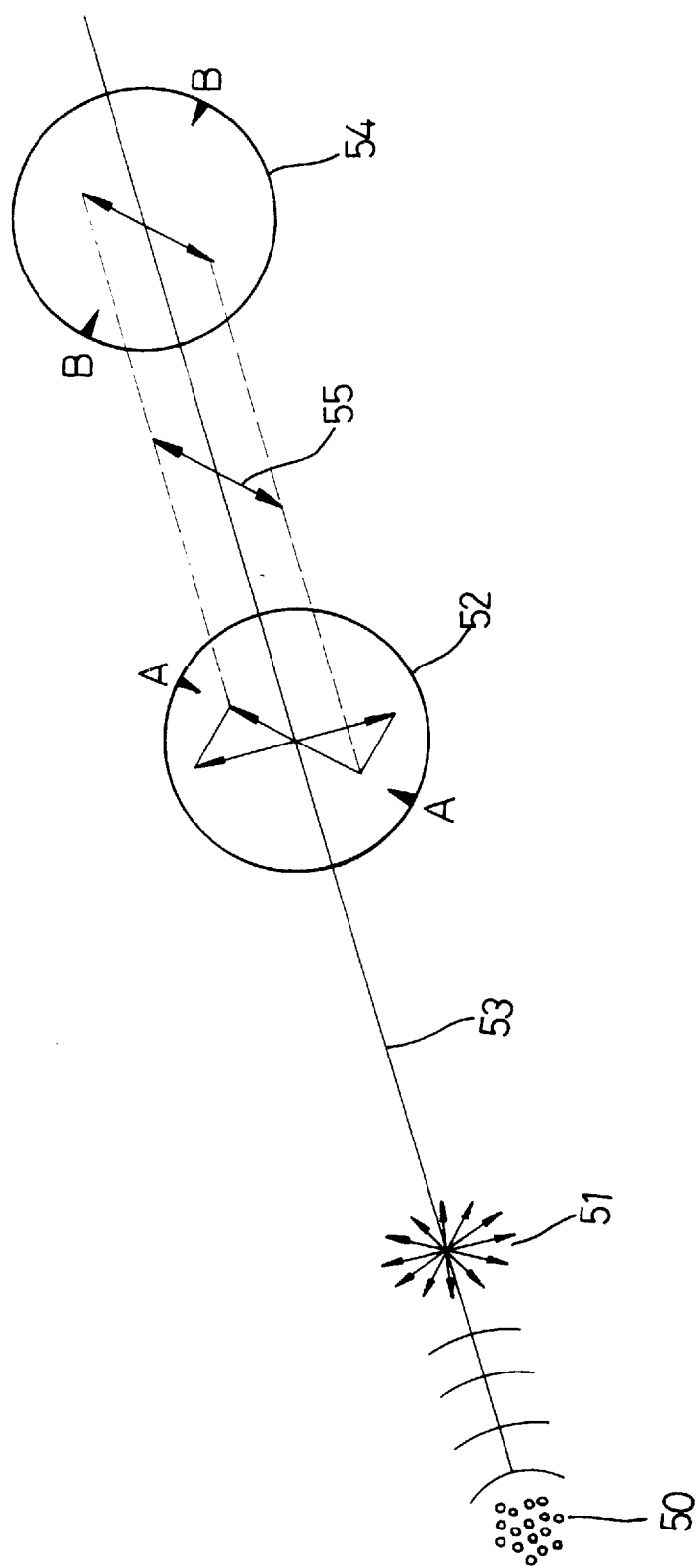
FIG. 4 shows a polarized light effect.

For a better understanding of features of the present invention, reference is now made to FIG. 4, illustrating the function of the polarizers.

A beam of light 51 emitting from a source 50 vibrates along all directions (as shown by the arrows) which are perpendicular to a travel path 53 of the beam of light 51. When the beam of light 51 approaches a first polarizer 52, only polarized light 55 vibrating along a plane A—A can pass through the first polarizer 52.

When the polarized light 55 approaches a second polarizer 54, no light can pass through the second polarizer 54 because only polarized light vibrating along a plane B—B which is perpendicular to the plane A—A can pass through the second polarizer 54 such that a shadow will be cast on the surface of the second polarizer 54.

In operation, referring to FIGS. 1–3, the object feature generator 40 is initially stuck on the object 30 to be identified. Then, the object sensing system 20 can be used to detect and receive an image (or signal) from the object feature generator 40 together with the object 30. Finally, the image (or signal) obtained by the object sensing system 20 is delivered into the computer system 10 to be processed therein.

For example, the sensors contained in the object sensing system 20 include cameras (not shown) which can be used to photograph the images of the object 30 together with the object feature generator 40.

Referring now to FIGS. 5–8 with reference to FIG. 1, when the object 30 is a moving body, the spatial division sensing device 21 of the object sensing system 20 can be used to obtain images from the object 30 together with the object feature generator 40.

Figure 6:
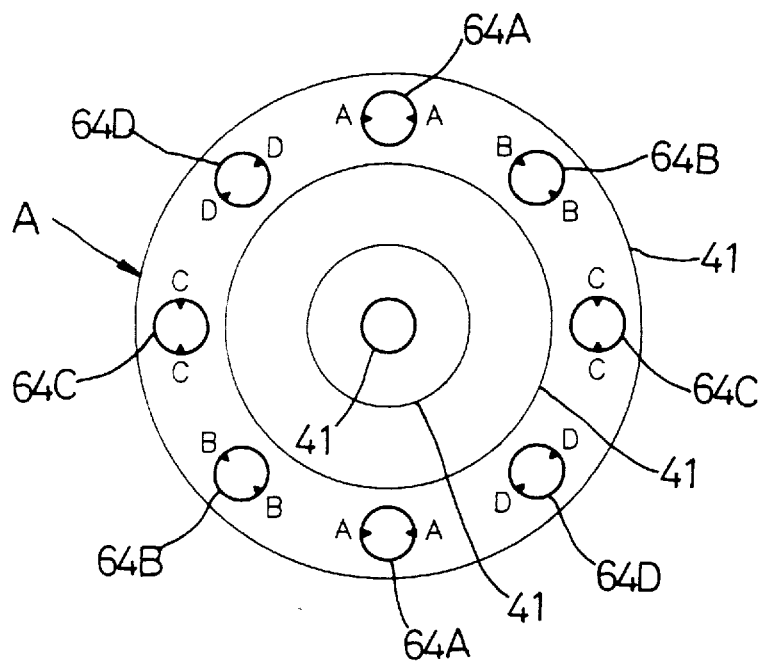
FIG. 6 shows a first image.

In practice, taking four pairs of polarizers 64A, 64B, 64C, and 64D for example, the sensor 211 of the spatial division sensing device 21 can be used to photograph the object feature generator 40 to form an image A as shown in FIG. 6. In the image A, polarized light vibrating along the planes A—A, B—B, C—C, and D—D can pass through the polarizers 64A, 64B, 64C, and 64D respectively.

Figure 7:
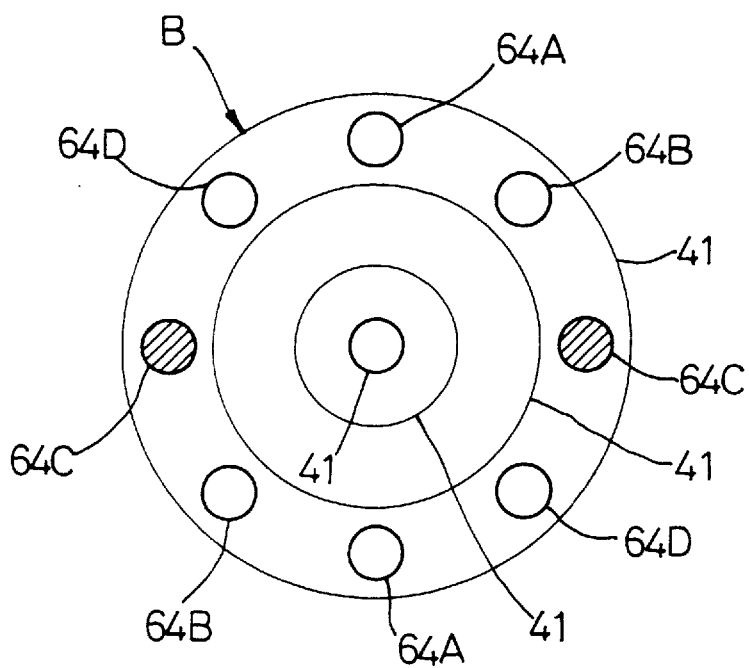
FIG. 7 shows a second image.

At the same time, the sensor 212 and the polarizer 60 of the spatial division sensing device 21 can be used to photograph the object feature generator 40 to form an image B as shown in FIG. 7.

In the image B, the polarizer 60 of the spatial division sensing device 21 together with the polarizers 64A, 64B, 64C, and 64D of the object feature generator 40 are appropriately arranged and oriented such that the polarized direction of the polarizer 60 and that of one pair of the four pairs of polarizers 64A, 64B, 64C, and 64D are able to form a right angle therebetween.

In such a situation, the polarized light from the polarizer 60 will be stopped by one pair of the four pairs of polarizers 64A, 64B, 64C, and 64D. For example, assuming that the polarized direction of the polarizer 60 is along the plane A—A which is perpendicular to the plane C—C, the polarized light from the polarizer 60 will be stopped by the pair of polarizers 64C, thereby projecting a shadow on the pair of polarizers 64C as shown in FIG. 7.

Figure 8:
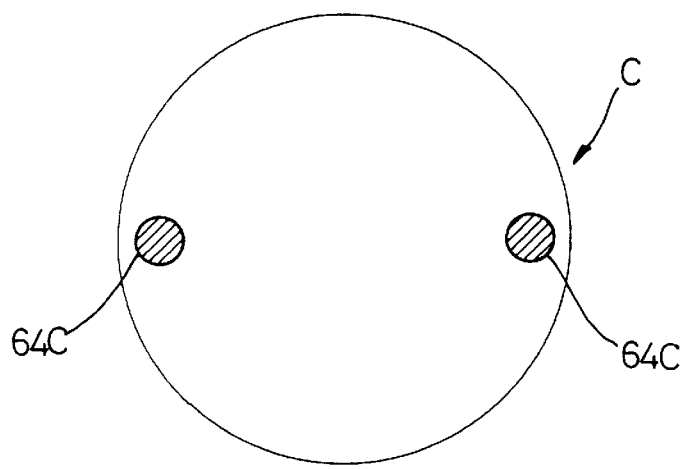
FIG. 8 shows a third image.
Figure 9:
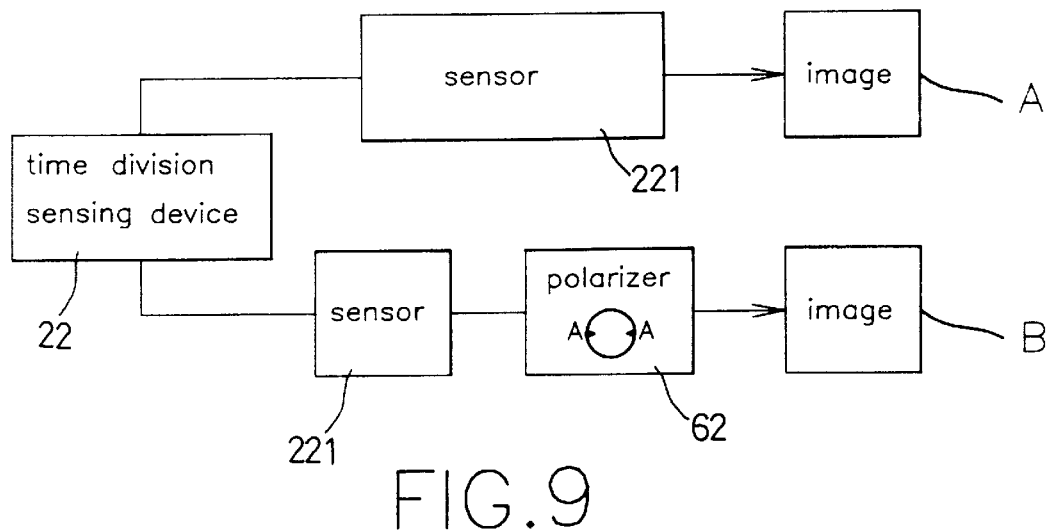
FIG. 9 is a flow chart showing an operation of a time division sensing device.

Then, the images A and B are both transferred into the computer system 10 which includes means for executing a subtractive operation and for performing a signal-filtering processing to filter error signals so as to obtain an image C as shown in FIG. 8. It can be seen that only the location of the polarizers 64C of the object feature generator 40 is displayed on the image C.

By such an arrangement, the computer system 10 can easily search and detect the position of the object 30 via the polarizers 64C of the object feature generator 40 on the image C.

Then, the computer system 10 can further recognize the object 30 via the color (or pattern) group of the object feature correspondents 41 shown on the image A or B.

For example, assuming that the four object feature correspondents 41 are combined to form a red-yellow-green-blue group which represents a book, or a red-yellow-red-black group which represents a cup, and so on. When the computer system 10 detects that the group of the four object feature correspondents 41 on the image A (or B) corresponds to a red-yellow-green-blue group, the computer system 10 can easily distinguish that the object 30 is a book.

By such an arrangement, the computer system 10 can find the position of the object 30 via one pair of polarizers 64 shown on the image C and can further recognize the type of the object 30 via the group of the object feature correspondents 41 shown on the image A or B.

Alternatively, referring to FIGS. 6–9 with reference to FIG. 1, when the object 30 is a stationary body, the time division sensing device 22 of the object sensing system 20 can be used to obtain images from the object 30 together with the object feature generator 40.

The sensor 221 of the time division sensing device 22 can be used to photograph the object feature generator 40 to form an image A as shown in FIG. 6.

Then, the sensor 221 together with the polarizer 62 of the time division sensing device 22 can be used to photograph the object feature generator 40 to form an image B as shown in FIG. 7.

In the image B, the polarizer 62 of the time division sensing device 22 together with the polarizers 64A, 64B, 64C, and 64D of the object feature generator 40 are appropriately arranged and oriented such that the polarized direction of the polarizer 62 and that of one pair of the four pairs of polarizers 64A, 64B, 64C, and 64D are able to form a right angle therebetween such that the polarized light from the polarizer 62 will be stopped by the pair of polarizers 64C, thereby projecting a shadow on the pair of polarizers 64C as shown in FIG. 7.

Then, the images A and B are both transferred into the computer system 10 for executing a subtractive operation and for performing a signal-filtering processing to filter error signals so as to obtain an image C as shown in FIG. 8. It can be seen that only the location of the polarizers 64C of the object feature generator 40 is displayed on the image C.

By such an arrangement, the computer system 10 can easily search and detect the position of the object 30 via the polarizers 64C of the object feature generator 40 on the image C.

Then, the computer system 10 can further recognize the object 30 via the color (or pattern) group of the object feature correspondents 41 shown on the image A or B.

Accordingly, the object recognizer in accordance with the present invention can be used to detect the position of the object 30 via one pair of polarizers 64 shown on the image C and to further recognize the type of the object 30 via the group of the object feature correspondents 41 shown on the image A or B no matter whether the object 30 is a moving body or a stationary body.

When the object recognizer of the present invention is employed in a super-market check out system, the object feature generator 40 can function as a bar code attached on products to be read.

The object recognizer can be used to detect the position of the products via the polarizers 64 of the object feature generator 40 and to recognize the types of the products via the group of the object feature correspondents 41 of the object feature generator 40.

Accordingly, the object recognizer in accordance with the present invention can be used to distinguish and recognize a determined product from others automatically.

It should be clear to those skilled in the art that further embodiments of the present invention may be made without departing from the scope and spirit of the present invention.

What is claimed is:

1. An object recognizer for identifying an object and comprising:

a computer system;

an object sensing system comprising a spatial division sensing device, said spatial division sensing device including a first sensor, a second sensor, and a first polarizer co-operating with said second sensor; and an object feature generator attached to said object and including a plurality of concentrically arranged ring-shaped object feature correspondents formed thereon, and a plurality of second polarizers mounted thereon, said second polarizers being arranged in diametrically opposed pairs wherein said first polarizer and said second polarizers are arranged and oriented such that a polarized direction of said first polarizer and that of one of said second polarizers are able to form a right angle therebetween;

whereby, said first sensor is able to detect a first signal supplied from said second polarizers and said object feature correspondents to form a first polarized image;

said second sensor co-operating with said first polarizer is able to synchronously detect a second signal supplied from said second polarizers and said object feature correspondents to form a second polarized image;

said computer system is able to execute an operation between said first image and said second image to obtain a third image, thereby determining the positions of said second polarizers on said third image so as to locate said object; and said computer system is able to detect patterns of said object feature correspondents on said first image, thereby recognizing the type of said object.

2. The object recognizer in accordance with claim 1, wherein said computer system includes means for executing a subtractive operation and a signal-filtering procedure between said first image and said second image.

3. The object recognizer in accordance with claim 1, wherein each of said object feature correspondents is a circle of color.

4. The object recognizer in accordance with claim 1, wherein each of said object feature correspondents is a circle of pattern.

5. An object recognizer for identifying an object and comprising:

a computer system;

an object sensing system comprising a time division sensing device, said time division sensing device including a sensor and a first polarizer; and an object feature generator attached to said object and including a plurality of ring-shaped object feature correspondents formed thereon, and a plurality of second polarizers mounted thereon, wherein said first polarizer and said second polarizers are arranged and oriented such that the polarized direction of said first polarizer and that of one of said second polarizers are able to form a right angle therebetween;

whereby, said sensor is able to detect a first signal supplied from said second polarizers and said object feature correspondents to form a first polarized image;

said sensor co-operating with said first polarizer is able to subsequently detect a second signal supplied from said second polarizers and said object feature correspondents to form a second polarized image;

said computer system is able to execute an operation between said first image and said second image to obtain a third image, thereby determining the positions of said second polarizers on said third image so as to locate said object; and said computer system is able to detect patterns of said object feature correspondents on said first image, thereby recognizing the type of said object.

\* \* \* \* \*